United States Patent [19]

Trowell et al.

[11] Patent Number: 5,075,417
[45] Date of Patent: Dec. 24, 1991

[54] POLYESTER POLYOLS FROM TALL OIL FATTY ACID, MALEIC ANHYDRIDE, AND AROMATIC POLYESTER POLYOLS

[75] Inventors: John M. Trowell; Billy S. Jessup, Jr., both of Wilmington, N.C.

[73] Assignee: Cape Industries, Wilmington, N.C.

[21] Appl. No.: 576,564

[22] Filed: Aug. 31, 1990

[51] Int. Cl.$^5$ .............................................. C08G 63/02
[52] U.S. Cl. .................................. 528/272; 528/279;
528/295.5; 528/302; 528/303; 525/437;
525/440; 525/444.5; 525/445; 525/454;
521/138; 521/157; 521/182; 428/318.4;
428/319.1; 428/423.1
[58] Field of Search ............... 528/272, 279, 295.5,
528/302, 303; 525/437, 440, 444.5, 445, 454;
521/138, 157, 182; 428/318.4, 319.1, 423.1

[56] References Cited

U.S. PATENT DOCUMENTS

| 3,892,796 | 7/1975 | Leibfried | 560/118 |
| 4,346,229 | 8/1982 | Derr et al. | 560/91 |
| 4,608,432 | 8/1986 | Magnus et al. | 528/274 |
| 4,609,513 | 9/1986 | Israel | 264/122 |
| 4,644,048 | 2/1987 | Magnus et al. | 528/176 |
| 4,720,571 | 1/1988 | Trowell | 560/91 |
| 4,758,602 | 7/1988 | Trowell | 521/109.1 |
| 4,897,429 | 1/1990 | Trowell et al. | 521/157 |
| 5,001,165 | 3/1991 | Canaday et al. | 521/131 |

Primary Examiner—John Kight, III
Assistant Examiner—Sam A. Acquah
Attorney, Agent, or Firm—Robert H. Hammer, III

[57] ABSTRACT

Polyester polyols are prepared by reacting a multifunctional adduct (e.g., maleic anhydride (MA)) and tall oil fatty acid, (TOFA), and then esterifying/transesterifying the MA/TOFA reaction product with an excess of aromatic polyester polyols (preferably such polyols are produced from dimethyl terephthalate (DMT) process residue and polyhydric alcohols). The polyester polyols may be used in the manufacture of rigid polyurethane (PUR) and rigid urethane-modified polyisocyanurate (PUR/PIR) foams.

21 Claims, No Drawings

POLYESTER POLYOLS FROM TALL OIL FATTY ACID, MALEIC ANHYDRIDE, AND AROMATIC POLYESTER POLYOLS

FIELD OF THE INVENTION

Polyester polyols are prepared by reacting a multifunctional adduct (e.g., maleic anhydride (MA)) and tall oil fatty acid (TOFA), and then esterifying/transesterifying the MA/TOFA reaction product with an excess of aromatic polyester polyols (preferably such polyols are produced from dimethyl terephthalate (DMT) process residue and polyhydric alcohols). The polyester polyols, disclosed herein, are compatible with trichlorofluoromethane blowing agents and may be used in the manufacture of rigid polyurethane (PUR) and rigid urethane-modified polyisocyanurate (PUR/PIR) foams. Moreover, these polyester polyols, are produced, in a cost-effective manner, by recycling certain chemical process residue.

BACKGROUND OF THE INVENTION

The use of polyester polyols in the manufacture of PUR and PUR/PIR foams is well known. For example, see U.S. Pat. Nos. 3,892,796; 4,346,229; 4,720,571; 4,758,602; and 4,897,429 (each of the foregoing patents are now assigned to the assignee of the instant invention) and U.S. Pat. Nos. 4,608,432 and 4,609,513 assigned to Stepan Company of Northfield, Ill.

In U.S. Pat. No. 3,892,796, the residue from a dimethyl terephthalate (DMT) process is hydrogenated, and thereafter the hydrogenated residue is reacted with alcoholic materials to form fluid polyols useful in the production of polyurethane end products.

In U.S. Pat. No. 4,346,229, DMT process residue is reacted with an excess of dipropylene glycol to yield a normally liquid aromatic polyester polyol. The resulting polyester polyol is compatible with FREON® 11 blowing agent and with glycerol and can be used in the production of blown polyurethane and polyisocyanurate-polyurethane foams.

In U.S. Pat. No. 4,608,432, self-compatiblizing polyester polyols are prepared by reacting a polyalkylene terephthalate, a low molecular weight aliphatic diol, and a compatibilizer compound selected from hydrophobic compounds and nonionic surfactant compounds. The hydrophobic compound may be a fat or an oil such a tall oil.

In U.S. Pat. No. 4,609,513, a binder used in the preparation of a synthetic board made from cellulosic and/or lignocellulosic material is disclosed. The binder comprises a polyisocyanate and a mixture of reactive hydrogen-containing compounds selected from a number of specified components or mixtures of components, e.g., a mixture of polyester polyol, diethylene glycol and tall oil. The urethane modified polyisocyanurate foam board is prepared by reacting a mixture of a polyisocyanate, a blowing agent, a urethane catalyst, a trimerization catalyst, and a mixture of polyester polyols.

In U.S. Pat. No. 4,644,048, polyester polyols are made from the reaction product of a phthalic acid compound, a low molecular weight diol compound, a hydrophobic compound and a nonionic surfactant compound. These polyols are produced by a simple heating process. These polyols are blendable with various conventional polyols and other additives to make prepolymer blends that can be catalytically reacted with organic isocyanates to produce cellular polyurethanes and polyurethane/polyisocyanurates.

In U.S. Pat. No. 4,720,571, a polyester polyol is prepared by reacting a mixture comprising scrap polyethylene terephthalate, DMT process residue, and at least two glycols having a molecular weight higher than ethylene glycol in the presence of an esterification/transesterification catalyst and at a specified ratio of glycol to scrap PET and DMT process residue, and subsequently removing glycol from the reaction product.

In U.S. Pat. No. 4,758,602, polyester polyols are prepared by esterifying tall oil with an excess of aromatic polyester polyols.

In U.S. Pat. No. 4,897,429, polyester polyols are prepared by esterifying tall oil fatty acid with DMT process residue and polyhydric alcohols; that reaction product reaction is then reacted with alkylene carbonate.

The polyols discussed above have a significant drawback in that they have low acid functionality (typically an acid functionality of 1) and low equivalent weight. There is a need for polyols which have low viscosities, high equivalent weights, improved fluorocarbon solubility, and higher functionality. Polyols with these qualities will yield foams with a tough, well-cured skin, as well as, good dimensional stability, flammability characteristics and compressive properties which make them useful in place of existing commercial materials.

In this specification, the term "urethane-modified polyisocyanurate foams" refers to foams prepared from polymers containing both urethane linkages and isocyanurate rings.

SUMMARY OF THE INVENTION

A process for preparing a mixture of polyester polyols comprises the steps of: reacting a multifunctional adduct and tall oil fatty acid thereby producing a first reaction product; and reacting the first reaction product with aromatic polyester polyols in the presence of an esterification/transesterification catalyst while continuously removing by-products that are formed during the last-mentioned reaction.

A mixture of polyester polyols is prepared by reacting a multifunctional adduct and tall oil fatty acid thereby forming a first reaction product; and reacting the first reaction product with aromatic polyester polyols in the presence of an esterification/transesterification catalyst while continuously removing by-products that are formed during the last-mentioned reaction.

A laminate comprising at least one facing sheet adhered to a polyurethane or urethane-modified polyisocyanurate foam is prepared by reacting a mixture comprising: an organic polyisocyanate; a blowing agent; a urethane catalyst; a trimerization catalyst; and a mixture of polyester polyols prepared by: reacting a multifunctional adduct and tall oil fatty acid thereby producing a first reaction product; and reacting the first reaction product with aromatic polyester polyols in the presence of an esterification/transesterification catalyst while continuously removing by-products that are formed during the last mentioned reaction.

DETAILED DISCUSSION OF THE INVENTION

The preparation of polyester polyols shall be discussed first. Thereafter, the preparation PUR and PUR/PIR foams from those polyester polyols shall be discussed. Finally, several examples illustrating the subject invention shall be presented.

The polyester polyols discussed hereinafter are prepared by a process involving two distinct sets of chemical reactions. In the first reaction set, a multifunctional adduct is added to tall oil fatty acid (TOFA), thereby producing multifunctional compounds. In the second reaction set, the multifunctional compounds are reacted with aromatic polyester polyols by an esterification/transesterification reaction, thereby producing the desired polyester polyols.

In the first reaction set, the multifunctional adduct is added to tall oil fatty acids, thereby producing multifunctional compounds. It is believed, although this invention is not limited to the theory set forth hereinafter, that the multifunctional adduct reacts with the conjugated fatty acids found in the tall oil fatty acids through the "Diels-Alder" reaction (see Morrison and Boyd, *Organic Chemistry, Third Edition*, pages 876-878) and that the multifunctional adduct reacts with both non-conjugated and monoolefinic fatty acids obtained by the "Ene" reaction (see Ross, J. et al., *J. Am. Chem. Soc.* 68, 1373 (1946); and Teeter, H. M. et al., *J. Am. Oil Chem. Soc.* 25, 158 (1948)). By these relatively simple reactions, the monofunctional fatty acids are converted to multifunctional compounds.

The term "multifunctional adduct", as used herein, refers to compounds such as maleic anhydride; fumaric acid; acrylic acid; and the like. When maleic anhydride or fumaric acid are used, trifunctional compounds result. When acrylic acid is used, a difunctional compound results. Maleic anhydride (MA), however, is preferred and, accordingly, the discussion hereinafter shall focus on its use.

The terms "tall oil fatty acid" or "TOFA", as used herein, refer to that component of tall oil produced by refining tall oil to separate tall oil rosins from the lighter molecular weight tall oil fatty acids. Typically, such tall oil fatty acids have a fatty acid percentage greater than 85%. Such tall oil fatty acids are commercially available under the tradename: PAMAK ®-4 from Hercules, Incorporated, Wilmington, Del. or ACINTOL ® FA-1 from Arizona Chemical Company, Panama City, Fla. or WESTVACO ® L-5 from Westvaco Chemical Division, Oleochemicals Department, Charlestown Heights, S.C. Tall oil, i.e. unrefined tall oil, could also be used in place of TOFA and, therefore, is included within the definition of TOFA; but, the PUR/PIR foams produced therefrom are not of the same quality.

In the second reaction set, the multifunctional compounds are reacted with aromatic polyester polyols thereby yielding the desired polyester polyol. It is believed, although this invention is not limited to the theory set forth hereinafter, that the multifunctional compounds and the aromatic polyester polyols undergo an esterification/transesterification reaction facilitated by the presence of an esterification/transesterification catalyst. A by-product mixture of water and/or methanol is generated during the esterification/transesterification reaction and is continuously removed overhead.

The term "aromatic polyester polyol" shall be discussed hereinafter. The aromatic polyester polyols contain at least two hydroxyl groups. Aromatic polyester polyols are prepared by esterifying an aromatic polycarboxycylic acid—containing material with a polyhydric alcohol, typically diethylene glycol (DEG). Other suitable polyhydric alcohols are set forth in U.S. Pat. No. 4,897,429, which is incorporated herein by reference. The aromatic polycarboxylic acid-containing materials can be, but are not limited to: depolymerized scrap polyethylene terephthalate, for example, from fibers, bottles or film; phthalic acid or phthalic anhydride; or dimethyl terephthalate (DMT) process residue; or dimethyl terephthalate; or terephthalic acid. Such aromatic polyester polyols are commercially available. Examples include TERATE ® 203 aromatic polyester polyol (Cape Industries, Wilmington, N.C.), CHARDOL 570 aromatic polyester polyol (Chardonol Corporation) and STEPANOL PS-3152 polyester polyol (Stepan Chemical Company).

The aromatic polyester polyols that are derived from the DMT process residue are prepared by reacting process residue with an excess of glycol or a mixture of glycols such as, for example, ethylene glycol; 1,2- or 1,3-propanediol; 1,3- or 1,4-butanediol; neopentyl glycol; hexanediol; diethylene glycol and dipropylene glycol. The preparation of such a product is described in U.S. Pat. No. 4,346,229, the disclosure of which is incorporated herein by reference. Aromatic polyester polyols that are the reaction product of DMT process residues and diethylene glycol are preferred. The most preferred aromatic polyester polyols are those produced from DMT process residues and/or scrap polyethylene terephthalate. Explemary properties of DMT process residues are set forth in U.S. Pat. No. 4,397,429 and are incorporated herein by reference.

In practice, the foregoing process may be carried out by either of two alternate methods First, maleic anhydride, tall oil fatty acid, and aromatic polycarboxylic acid—containing material are mixed and heated. Thereafter, polyhydric alcohol is added to the reaction mass and then mixed and heated while removing the by-product mixture of water and/or methanol. See generally, Examples 1, 3, 4, 9 and 10. Second, maleic anhydride and TOFA are mixed and heated. Thereafter, aromatic polycarboxylic acid-containing material and polyhydric alcohol are added to the reaction mass and then mixed and heated while removing the by-product mixture of water and/or methanol. See generally, Examples 5, 6 and 8.

With regard to the first method, the maleic anhydride, tall oil fatty acid, and aromatic polycarboxylic acid-containing material are charged into a reaction vessel. The ratio of maleic anhydride to TOFA should be about 0.05:1 to about 0.40:1, preferably about 0.2:1. The mixture is agitated and heated to a temperature ranging from about 230° C. to about 240° C. at atmospheric pressure and then held at that temperature for a period of about two hours. Reaction pressures greater than atmospheric could be used if maleic anhydride sublimation becomes a problem. The reaction time of about two hours appears to be a minimum amount of time, greater lengths of time could be used.

Thereafter, the polyhydric alcohol and the esterification/transesterification catalyst are added to the reaction mass. This mixture, which cools because of the addition of the polyhydric alcohol, is agitated and heated to a temperature ranging from about 180° C. to about 235° C. at atmospheric pressure and is held at that temperature until the completion of the reaction. Completion of the reaction is evidenced by cessation of by-product generation. It will be apparent to one skilled in the art that pressures higher or lower than atmospheric can be used. At higher pressures, the reaction temperature can be increased significantly, thus shortening the reaction time. At lower pressures, the removal of by-products is facilitated.

Any catalyst suitable for esterification or transesterification reactions can be used in the process of this invention. Such catalysts are well known in the art and include, but are not limited to, tetraisopropyl titanate, zinc oxide, and calcium, magnesium, zinc and tin salts of acetic acid. Tetraisopropyl titanate is preferred. A minimum level of 0.72 grams per kilogram of total charge is required. The upper limit is controlled by the economics of the process and by the amount of residual catalyst from the manufacture of the aromatic polyester polyol.

With regard to the second method, maleic anhydride and tall oil fatty acid are charged into a reaction vessel. The ratio of maleic anhydride to TOFA should be about 0.05:1 to about 0.40:1, preferably about 0.2:1. The mixture is agitated and heated to a temperature ranging from about 230° C. to about 240° C. at atmospheric pressure and then held at that temperature for a period of about two hours. Reaction pressures greater than atmospheric could be used, if maleic anhydride sublimation becomes a problem. The reaction time of about two hours appears to be a minimum amount of time, greater lengths of time could be used.

Thereafter, aromatic polycarboxylic acid-containing material, polyhydric alcohol, and catalyst (same as discussed above) are added to the reaction mass. This mixture, which cools because of the addition of the aromatic polycarboxylic acid-containing material and polyhydric acid, is agitated and heated to a temperature ranging from about 180° C. to about 235° C. at atmospheric pressure and is held at that temperature until the completion of the reaction. Completion of the reaction is evidenced by cessation of by-product generation. It will be apparent to one skilled in the art that pressures higher or lower than atmospheric can be used. At higher pressures, the reaction temperatures can be increased significantly, thus shortening the reaction time. At lower pressures, the removal of by-products is facilitated.

For use in PUR and PUR/PIR foam formulations, the polyester polyols of this invention preferably have a hydroxyl number of 90–350 and a viscosity of 1,000 to 18,000 cps at 25° C. Any desired hydroxyl number within the range can be obtained by adjusting the amount of glycol charged in the original reaction mixture. Particularly desirable products have a hydroxyl number of 150–210 and a viscosity of 1500–18,000 cps at 25° C., or a hydroxyl number of 270–350 and a viscosity of 1000–3000 cps at 25° C.

The polyester polyols of this invention are compatible with trichlorofluoromethane, a conventional blowing agent used in the production of closed-cell rigid foams and sold under the trademark FREON 11 (DuPont, Wilmington, Del.). The polyester polyol is considered to be 100% compatible with the trichlorofluoromethane blowing agent at a solubility of 30% by weight FREON in the polyol. The neat polyester polyols of this invention have a FREON solubility approaching 30% or higher.

The polyester polyols prepared by this process can be used in foam-forming formulations for the manufacture of rigid foams. These foams have the dimensional stability and compressive strength required for the manufacture of PUR/PIR laminate foam boards in both PUR and PUR/PIR "pour-in-place" applications. The laminated boards are used as building panels and can comprise a single facing sheet having the foam thereon, or a facing sheet on either side of the foam. Any facing sheet material employed to produce building panels can be used. Examples of suitable facing sheet materials include, among others, craft paper, aluminum foil, glass and asphalt impregnated felts, as well as laminates of two or more of these materials. In "pour-in-place" applications, the liquid foam forming formulation is poured into a cavity where it foams, fills the cavity, and hardens and cures in place.

A typical foam formulation would include: an organic polyisocyanate; a blowing agent; a urethane catalyst; a trimerization catalyst; and a mixture of the above-discussed polyester polyols. Such formulations are within the ordinary skill of the art (for example see U.S. Pat. No. 4,609,513 which is incorporated herein by reference).

The following examples illustrate the invention, but they are not intended to limit its scope in any way. All parts and weight percentages in this specification are by weight unless otherwise noted:

EXAMPLE 1

To a three-liter round bottom glass four-neck flask equipped with a variable speed agitator, thermal well, nitrogen purge and an overhead system consisting of a 100 mm vacuum jacketed distillation column packed with glass rings and a Friedrich condenser, the following ingredients were charged:

| | |
|---|---|
| DMT Residue (TERATE ® 101 Cape Industries, Wilmington, NC) | 820 grams |
| Tall Oil Fatty Acids (PAMAK ®-4) | 362 grams |
| Maleic Anhydride | 71 grams |

Heat was applied to the agitated flask with an electrical heating mantle and a nitrogen blanket of 0.1–0.2 SCFH initiated. Heat was continued and the reactor contents brought to a temperature of 230° C. and held for two hours. During this time period no overheads were obtained or any sublimation of the maleic anhydride observed. At the end of the two-hour hold at 230° C., 838 grams of diethylene glycol containing 1.5 grams of a catalyst, Tyzor TPT (tetraisopropyltitanate), were added to the reactor flask. The contents of the reactor were cooled to approximately 160° C. by the addition of the glycol. Heat was continued and at a temperature of 185° C., reaction was observed by the generation of overheads which were continuously removed and condensed. At a reactor temperature of 235° C., or approximately one hour and fifteen minutes after initiation of reaction, the generation of overheads had essentially ceased. After an additional one hour and thirty minutes at 235° C., the heat to the reactor was discontinued and the reactor contents allowed to cool to ambient temperature. The total overheads collected during the reaction were 166.3 grams.

The final product had the following analysis:

| | |
|---|---|
| Viscosity, cps @25° C. | 17,500 |
| Hydroxyl Number | 225 |
| Acid Number | 2.13 |
| Diethylene Glycol, % | 10.2 |
| Water, % | 0.01 |

EXAMPLE 2

To the product described in Example 1, 2.04 grams of diethylene glycol were added at ambient temperature per 100 grams of product. The analysis of this blended product was as follows:

| Viscosity, cps @25° C. | 14,600 |
|---|---|
| Hydroxyl Number | 240 |
| Acid Number | 2.10 |
| DEG, % | 12.0 |
| Water, % | 0.05 |

EXAMPLE 3

To a twenty-two liter round bottom glass four-neck flask equipped with a variable speed agitator, thermal well, nitrogen purge and an overhead system consisting of a 300 mm vacuum jacketed distillation column packed with ¼-inch glass rings and an allihn condenser, the following were charged:

| DMT Residue (TERATE ® 101) | 6,011 grams |
|---|---|
| Tall Oil Fatty Acids (PAMAK ®-4) | 2,653 grams |
| Maleic Anhydride | 520 grams |

Heat was applied to the agitated flask with an electrical heating mantle and a nitrogen blanket of 0.2 SCFH initiated. Heat was continued and the reactor contents brought to a temperature of 235° C. and held at this temperature for two hours. At the end of the two-hour period, 6,181 grams of diethylene glycol containing 11 grams of Tyzor TPT catalyst were added to the reactor flask. The addition of the glycol cooled the reactor to less than 180° C. Heat was increased and at 184° C., reaction was observed by the generation of overheads which were continuously removed and condensed. At a reaction temperature of 235° C., or approximately two hours and twenty minutes after initiation of reaction, the generation of overheads had essentially ceased. The temperature of the reactor was maintained at 235° C. for an additional two hours or until the viscosity of the product stabilized. The total amount of overheads condensed and collected were 1,428 grams. The heat was discontinued and the reactor cooled to 100° C. and the product transferred to four one-gallon containers.

The analysis of the final product was as follows:

| Viscosity, cps @25° C. | 12,200 |
|---|---|
| Hydroxyl Number | 239 |
| Acid Number | 3.87 |
| Diethylene Glycol, % | 9.83 |
| Water, % | 0.11 |

EXAMPLE 4

Example 3 is identical in all respects to Example 1 except PAMAK ® 4 was replaced with Column No. 3 distillate from the Hercules Incorporated, Savannah, Ga. plant. The distillate is very similar to PAMAK ®-4, is commercially available, and has the following typical analysis: Acid Number-185; Rosin acids, %—2.3; unsaps, %—6.4; color—8+; titer—6. The analysis of the final product was as follows:

| Viscosity, cps @25° C. | 16,000 |
|---|---|
| Hydroxyl Number | 224 |
| Acid Number | 2.03 |
| Diethylene Glycol, % | 9.65 |
| Water, % | 0.01 |

EXAMPLE 5

To a reactor similar to the one described in Example 1, except the reactor volume was five liters, the following ingredients were charged:

| Tall Oil Fatty Acids (PAMAK-4) | 440 grams |
|---|---|
| Maleic Anhydride | 86 grams |

Heat was applied to the agitated flask with an electrical heating mantle and a nitrogen blanket of 0.1–0.2 SCFH initiated. Heat was continued and the reactor contents brought to a temperature of 235° C. and held at this temperature for two hours. At the end of this time period, 998 grams of phthalic anhydride and 1,145 grams of diethylene glycol, containing 1.8 grams of catalyst Tyzor TPT, were added to the reactor. The reactor was reheated and at a temperature of 168° C., reaction was observed by the generation of overheads which were continuously removed and condensed. At a reactor temperature of 235° C., or approximately two hours after initiation of reaction, the generation of overheads had essentially ceased. The reactor was maintained at 235° C. for an additional three hours and thirty minutes or until the residual acid number of the reactor product had been reduced to an acceptable level. The heat was discontinued to ambient temperature. The total overheads collected during the reaction were 177 grams.

The final product had the following analysis:

| Viscosity, cps @25° C. | 20,200 |
|---|---|
| Hydroxyl Number | 125 |
| Acid Number | 4.3 |
| DEG, % | 3.56 |
| Water, % | 0.01 |

EXAMPLE 6

To a reactor identical to that used in Example 5, the following ingredients were charged:

| Tall Oil Fatty Acids (PAMAK-4) | 669 grams |
|---|---|
| Maleic Anhydride | 131 grams |

As described in Example 4, the reactor was heated to 235° C. and after two hours, 200 grams of DMT residue (Terate 101), 1,868 grams diethylene glycol, containing 3.35 grams of catalyst Tyzor TPT, and 1,800 grams of scrap polyethylene glycol terephthalate (PET) bottle resin were added. The reactor was reheated and reaction initiated at 188° C. as evidenced by the generation of over-heads. Heat was continued to a maximum of 260° C. and the overheads temperature allowed to increase to 170–200° C. to facilitate the removal of liberated ethylene glycol originating from the scrap PET. The heat on the reactor was maintained at 260° C. until, by analysis, the free ethylene glycol content of the reactor product was less than one percent, or approximately four hours after initiation of reaction. The product was allowed to cool to ambient temperature. Total overheads collected were 661 grams. The analysis of the final product was as follows:

| | |
|---|---|
| Viscosity, cps @25° C. | 16,000 |
| Hydroxyl Number | 195 |
| Acid Number | 0.67 |
| Diethylene Glycol, % | 5.90 |
| Ethylene Glycol, % | 0.80 |
| Water, % | 0.01 |

EXAMPLE 7

To the product described in Example 6, 6.38 grams of diethylene glycol were added at ambient temperature per 100 grams of product. The analysis of the blended product was as follows:

| | |
|---|---|
| Viscosity, cps @25° C. | 7,700 |
| Hydroxyl Number | 246 |
| Acid Number | 0.7 |
| DEG, % | 12.0 |
| Water, % | 0.05 |

EXAMPLE 8

Example 8 was identical in all respects to Example 5 except the diethylene glycol charge to the reactor was increased to 1,500 grams. The final product analysis was as follows:

| | |
|---|---|
| Viscosity, cps @25° C. | 2,500 |
| Hydroxyl Number | 253 |
| Acid Number | 3.47 |
| DEG, % | 10.4 |
| Water, % | 0.04 |

EXAMPLE 9

Example 9 was identical in all respects to Example 1, except the diethylene glycol charge to the reactor was increased to 878 grams. The final product analysis was as follows:

| | |
|---|---|
| Viscosity, cps @25° C. | 10,700 |
| Hydroxyl Number | 267 |
| Acid Number | 3.52 |
| Diethylene Glycol, % | 11.9 |
| Water, % | 0.10 |

EXAMPLE 10

To a reactor setup as described in Example 1, 1,100 grams of the product from Example 9 were charged. The reactor heat was initiated and 34 grams of propylene carbonate and 1.34 grams of tributylamine were added. The heat was continued and the reactor held at 225-230° C. for one hour. The product was then rapidly cooled to 100° C. The analysis of the final product was as follows:

| | |
|---|---|
| Viscosity, cps @25° C. | 6,800 |
| Hydroxyl Number | 254 |
| Acid Number | 1.76 |
| Diethylene Glycol, % | 8.48 |
| Propylene Carbonate, % | 2.10 |
| Water, % | 0.03 |

EXAMPLE 11

To 300 parts by weight of the product in Example 2 was added 171.8 parts sucrose amine (Mobay Corp.), 69.4 parts flame retardant (Antiblaze 80, Albright and Wilson Americas), 9.9 parts silicone surfactant (DC-193, Air Products and Chemicals), 7.3 parts amine catalyst (Polycat-8, Air Products and Chemicals), 3.3 parts water, 99.1 parts Refrigerant II (Freon° E. I. DuPont) and stirred to give a uniform solution. At ambient (25° C.×2°) conditions, 112.2 parts of the master solution was weighed into a cup and 77.8 parts of MDI Isocyanate (BASF M-70-L) was added, then stirred at high speed and rapidly poured into a 3.5×5×6.75-inch paperboard container and allowed to foam. The molar ratio of isocyanate groups to hydroxyl groups or isocyanate index was calculated to be 1.10. Initial cream was observed at 14 seconds, gelatin at 34 seconds, tack free at 51 seconds, and maximum rise at 69 seconds. The master solution was split in equal amounts and placed in pressure-tested containers at ambient temperatures and at 49° C. and reevaluated weekly for 28 days. The above described procedure was used to make foam and results are listed in the table below:

| | Cream Secs. | Gelatin Secs. | Tack Free Secs. | Maximum Rise |
|---|---|---|---|---|
| 7 Days Ambient | 15 | 38 | 51 | 74 |
| 7 Days @49° C. | 15 | 41 | 54 | 77 |
| 14 Days Ambient | 14 | 38 | 52 | 72 |
| 14 Days @49° C. | 16 | 43 | 63 | 87 |
| 21 Days Ambient | 16 | 41 | 59 | 78 |
| 21 Days @49° C. | 18 | 44 | 68 | 88 |
| 28 Days Ambient | 16 | 41 | 61 | 79 |
| 28 Days @49° C. | 18 | 45 | 66 | 87 |

EXAMPLE 12

Example 12 is exactly like Example 11 up to the mixing of master solution and MDI Isocyanate (BASF M-70-L). At ambient (25° C.×2°) conditions, 660.8 parts master solution was weighed into a cup and 517.1 parts of MDI Isocyanate (BASF M-70-L) was added, then stirred at high speed and rapidly poured into a 12-inch square box mold, allowed to foam and cure for a minimum of 24 hours at ambient conditions. This mixture was calculated to have a 1.10 isocyanate index. Initial cream was observed at 20 seconds, gelatin at 42 seconds, tack free at 61 seconds and maximum rise at 84 seconds. The table below lists test methods and results of other testing.

| Testing Methods | Results |
|---|---|
| 1. Thermal Conductivity Using Anacon Model 88 Machine | |
| Initial in BTU-in./HrFt2 °F. | .130 |
| 10 days aged @140° F. in BTU-in./HrFt$^2$ °F. | .163 |
| 2. Open Cell Content ASTM D2856-87, in % | 6.75 |
| 3. Friability ASTM C421-83, in % | 2.03 |
| 4. Compressive Strength Parallel to Foam Rise ASTM D1621-73 (1979) in Lbs./In.$^2$ | 25.04 |
| 5. Humid Age Testing ASTM D2126-87 % Change in Volume | |
| 1 Day | −0.73 |
| 7 Days | −2.28 |
| 6. 45° Angle Burn | 7.79 |

| Testing Methods | Results |
| --- | --- |
| Mobil Chemical, in % | |
| 7. Apparent Density ASTM 1622-83, in Lbs./Ft³ | 2.65 |

EXAMPLE 13

A reactivity profile using commercial Terate+254, Example 2, Example 5, and Example 6 was compiled. To 134.8 parts (Terate 254, Example 2, Example 5, or Example 6), by weight, was added, 3.0 parts potassium-based catalyst (Dabco K-15, Air Products and Chemicals), 1-2 parts amine catalyst Dabco TMR-30, Air Products and Chemicals), Refrigerant II (Freon , E. I. DuPont), and stirred to give a uniform solution. At ambient (25° C.+2° C.) conditions, to the above solutions was added 200 parts MDI Isocyanate (BASF M-70-L), which was then stirred at high speed and rapidly poured into 165 oz. untreated tub and allowed to foam. The calculated indexes and results are listed in the table below.

| Polyol Used | Calculated Index | Cream Secs. | Gelatin Secs. | Tack Free Secs. | Maximum Rise Secs. |
| --- | --- | --- | --- | --- | --- |
| Terate 254 | 270 | 14 | 37 | 45 | 72 |
| Example 2 | 258 | 24 | 49 | 57 | 99 |
| Example 5 | 496 | 29 | 55 | 69 | 107 |
| Example 6 | 318 | 17 | 40 | 50 | 79 |

EXAMPLE 14

To 407.2 parts by weight of Example 2 was added 12.2 parts potassium-based catalyst (Dabco K-15, Air Products and Chemicals), 4.3 parts amine catalyst (Dabco TMR-30, Air Products and Chemicals), 9.1 parts silicone surfactant (DC-193, Air Products and Chemicals), Refrigerant II (FREON E. I. DuPont), and stirred to give a uniform solution. At ambient (250° C.+2°) conditions, to the above solution was added 590.4 parts MDI Isocyanate (BASF M-70-L), which was then stirred at high speed and rapidly poured into a 12-inch square box mold, allowed to foam and cure for a minimum of 24 hours at ambient conditions. This mixture was calculated to have 2.60 isocyanate index. Initial cream was observed at 22 seconds, gelatin at 45 seconds, tack free at 54 seconds, and maximum rise at 106 seconds. The table below lists the results of other testing.

| Testing Methods | Results |
| --- | --- |
| 1. Thermal Conductivity Using Anacon Model 88 Machine | |
| Initial in BTU-in./HrFt2 °F. | .111 |
| 10 days aged @140° F. in BTU-in./HrFt2.F | .148 |
| 2. Open Cell Content ASTM D2856-87, in % | 5.81 |
| 3. Friability ASTM C421-83, in % | 10.15 |
| 4. Compressive Strength Parallel to Foam Rise ASTM D1621-73 (1979) in Lbs./In.² | 18.03 |
| 5. Humid Age Testing ASTM D2126-87 % Change in Volume | |
| 1 Day | 3.37 |
| 7 Days | 7.43 |
| 6. 45° Angle Burn Mobil Chemical, in % | 4.06 |
| 7. Apparent Density ASTM 1622-83, in Lbs./Ft³ | 1.65 |

We claim:

1. A process for preparing a mixture of polyester polyols comprising the steps of:
   reacting a multifunctional adduct and tall oil fatty acid thereby producing a first reaction product; and
   reacting the first reaction product with aromatic polyester polyols in the presence of an esterification/transesterification catalyst while continuously removing by-products that are formed during the last mentioned reaction.

2. The process according to claim 1 wherein said multifunctional adduct is selected from the group consisting of: maleic anhydride; fumaric acid; or acrylic acid.

3. The process according to claim 2 wherein said multifunctional adduct is maleic anhydride.

4. The process according to claim 1 wherein the ratio of said multifunctional adduct to said tall oil fatty acid ranges from about 0.05:1 to about 0.40:1.

5. The process according to claim 4 wherein the ratio of said multifunctional adduct to said tall oil fatty acid is about 0.2:1.

6. The process according to claim 1 wherein said aromatic polyester polyols are prepared by esterifying an aromatic polycarboxylic acid-containing material with a polyhydric alcohol.

7. The process according to claim 6 wherein said aromatic polycarboxylic acid-containing material is selected from the group consisting of dimethyl terephthalate process residue or scrap polyethylene terephthalate 8. A mixture of polyester polyols prepared by the reaction comprising the steps of:
   reacting a multifunctional adduct and tall oil fatty acid thereby producing a first reaction product; and
   reacting the first reaction product with aromatic polyester polyols in the presence of an esterification/transesterification catalyst while continuously removing by-products that are formed during the last mentioned reaction.

9. The mixture according to claim 8 wherein said multifunctional adduct is selected from the group consisting of: maleic anhydride; fumaric acid; or acrylic acid.

10. The mixture according to claim 9 wherein said multifunctional adduct is maleic anhydride.

11. The mixture according to claim 8 wherein the ratio of said multifunctional adduct to said tall oil fatty acid ranges from about 0.05:1 to about 0.40:1.

12. The process according to claim 11 wherein the ratio of said multifunctional adduct to said tall oil fatty acid is about 0.2:1.

13. The process according to claim 8 wherein said aromatic polyester polyols are prepared by esterifying an aromatic polycarboxylic acid-containing material with a polyhydric alcohol.

14. The process according to claim 13 wherein said aromatic polycarboxylic acid-containing material is selected from the group consisting of dimethyl terephthalate process residue or scrap polyethylene terephthalate.

15. A laminate comprising at least one facing sheet adhered to a urethane-modified polyisocyanurate foam prepared by reacting a mixture comprising:
1) an organic polyisocyanate;
2) a blowing agent;
3) a urethane catalyst;
4) a brimerization catalyst; and
5) a mixture of polyester polyols prepared by:
reacting a multifunctional adduct and tall oil fatty acid thereby producing a first reaction product; and reacting the first reaction product with aromatic polyester polyols in the presence of an esterification/transesterification catalyst while continuously removing by-product that are formed during the last mentioned reaction.

16. The laminate according to claim 15 wherein said multifunctional adduct is selected from the group consisting of: maleic anhydride; fumaric acid; or acrylic acid.

17. The laminate according to claim 16 wherein said multifunctional adduct is maleic anhydride.

18. The laminate according to claim 15 wherein the ratio of said multifunctional adduct to said tall oil fatty acid ranges from about 0.05:1 to about 0.40:1.

19. The laminate according to claim 18 wherein the ratio of said multifunctional adduct to said tall oil fatty acid is about 0.2:1.

20. The laminate according to claim 15 wherein said aromatic polyester polyols are prepared by esterifying an aromatic polycarboxylic acid-containing material with a polyhydric alcohol.

21. The laminate according to claim 20 wherein said aromatic polycarboxylic acid-containing material is selected from the group consisting of dimethyl terephthalate process residue or scrap polyethylene terephthalate.

* * * * *